United States Patent
Cheung

(10) Patent No.: US 10,869,456 B2
(45) Date of Patent: Dec. 22, 2020

(54) PET STROLLER WITH FOLDABLE ACCESS RAMP ASSEMBLY

(71) Applicant: Brandon Cheung, Arcadia, CA (US)

(72) Inventor: Brandon Cheung, Arcadia, CA (US)

( * ) Notice: Subject to any disclaimer, the term of this patent is extended or adjusted under 35 U.S.C. 154(b) by 177 days.

(21) Appl. No.: 16/258,463

(22) Filed: Jan. 25, 2019

(65) Prior Publication Data

US 2020/0236895 A1   Jul. 30, 2020

(51) Int. Cl.
*A01K 1/03*   (2006.01)
*A01K 1/00*   (2006.01)
*A01K 1/02*   (2006.01)

(52) U.S. Cl.
CPC .......... *A01K 1/0035* (2013.01); *A01K 1/0272* (2013.01)

(58) Field of Classification Search
CPC ......... A61G 3/061; A61G 3/067; B60P 1/431; B60R 3/02; A01K 1/0236; A01K 1/0245; A01K 1/0254; A01K 1/0035; A01K 1/0272
USPC ................. 119/496, 482; 280/647
See application file for complete search history.

(56) References Cited

U.S. PATENT DOCUMENTS

| | | | | |
|---|---|---|---|---|
| 5,213,060 A * | 5/1993 | Sloan | .................... | A01K 1/0353 119/847 |
| 5,393,192 A * | 2/1995 | Hall | ...................... | A61G 3/061 14/69.5 |
| 6,536,372 B1 * | 3/2003 | Loeser | .................... | A01K 1/035 119/28.5 |
| 7,261,060 B1 * | 8/2007 | Garofola | .............. | A01K 1/0236 119/482 |
| 7,493,874 B2 * | 2/2009 | Simpson | .............. | A01K 1/0272 119/849 |
| 7,523,516 B1 * | 4/2009 | Waddell, V | ............... | E04H 4/06 14/69.5 |
| 7,878,150 B2 * | 2/2011 | Dietz | ................... | A01K 1/0353 119/482 |
| 7,921,812 B1 * | 4/2011 | Carrillo | ............... | A01K 13/001 119/604 |
| 7,958,586 B1 * | 6/2011 | Carter | .................... | B65G 69/30 14/69.5 |
| 8,312,846 B1 * | 11/2012 | Murray | .................. | B65G 19/00 119/847 |
| 8,926,254 B2 * | 1/2015 | Pocobello | .............. | A61G 3/061 414/537 |
| 2001/0038787 A1 * | 11/2001 | Beck | ...................... | B60P 1/433 414/537 |
| 2004/0146385 A1 * | 7/2004 | Edwards | ................. | B60P 1/431 414/537 |
| 2006/0169218 A1 * | 8/2006 | Chang | .................. | A01K 1/0254 119/496 |
| 2006/0245883 A1 * | 11/2006 | Fontaine | ................ | B60P 1/431 414/537 |

* cited by examiner

*Primary Examiner* — Yvonne R Abbot-Lewis
(74) *Attorney, Agent, or Firm* — Tsz Lung Yeung

(57) ABSTRACT

A pet stroller includes a supporting frame and a foldable access ramp assembly, wherein the supporting frame includes a supporting platform for a pet lying thereon. The foldable access ramp assembly, which is provided at the supporting frame, includes a ramp member slidably coupled at the supporting frame and being moved in a storage position that the ramp member is supported underneath the supporting platform, and an extension position that the ramp member is slid out frontwardly to extend from the supporting platform for the pet easily accessing in-and-out from the supporting platform.

17 Claims, 4 Drawing Sheets

PET STROLLER WITH FOLDABLE ACCESS RAMP ASSEMBLY

BACKGROUND OF THE PRESENT INVENTION

Field of Invention

The present invention relates generally to a pet transporting device, and, in particular, to a pet stroller with a foldable access ramp assembly adapted to fold underneath a supporting platform and adapted to extend out of the supporting platform for being deployed over a curb or onto a sidewalk. The foldable access ramp assembly is also adapted to extend to couple at a vehicle to form a bridge between the supporting platform and the vehicle.

Description of Related Arts

In general, pet owners know their dogs need regular exercise, potty breaks, and interact with other people and/or other dogs. Walk the dog becomes a daily routine for the pet owner, wherein a moderate walk is about 30 to 30 minutes to help the dogs physically and mentally happy. In some circumstances, the pet owners would like to carry the dog by a pet stroller. Accordingly, the pet stroller is configured for placing a pet to travel from places to places. For instant, the pet owners want to bring their dogs to the park or to have a long walk. Some seniors have troubles carrying the dogs in and out the pet stroller. An injured dog or a disabled dog may not able to jump in and out the pet stroller. Lowering the ground level of the pet stroller to allow the easy access may not be a good idea because the pet stroller cannot be pushed conveniently over some rough terrains such as grass and sand.

A need exists for a pet stroller with a ramp for easy accessing. It is to the provision of such a ramp that the present disclosure is primarily directed.

SUMMARY OF THE PRESENT INVENTION

The present invention is a pet stroller which eliminates the aforesaid drawbacks. The pet stroller comprises a supporting frame and a foldable access ramp assembly, wherein the supporting frame includes a supporting platform for a pet lying thereon. The foldable access ramp assembly, which is provided at the supporting frame, comprises a ramp member slidably coupled at the supporting frame and being moved between a storage position and an extension position. At the storage position, the ramp member is supported underneath the supporting platform. At the extension position, the ramp member is slid out frontwardly to extend from the supporting platform for the pet easily accessing in-and-out from the supporting platform.

It is therefore an object of the present invention to provide a pet stroller that accommodates one or more pets with easy access.

It is a further object of the present invention to provide a pet stroller, wherein the ramp member is adapted for being deployed over a curb or onto a sidewalk to allow the pet easily going in-an-out the supporting platform.

It is a further object of the present invention to provide a pet stroller, wherein the ramp member is adapted for extending to couple at a vehicle to form a bridge between the supporting platform and the vehicle.

It is a further object of the present invention to provide a pet stroller, wherein the ramp member is a telescopic member to selectively adjust an extension length thereof.

It is a further object of the present invention to provide a pet stroller, wherein the ramp member has a top anti-slipping surface for the pet walking thereon.

It is a further object of the present invention to provide a pet stroller, wherein a front gate pivotally coupled at a front edge of the ramp member to form a front guide of the supporting frame as a part of a boundary thereof.

It is a further object of the present invention to provide a pet stroller that significantly improves the versatility and efficiency of the conventional pet stroller.

It is a further object of this invention to provide a pet stroller that utilizes large, easily maneuverable wheels and a lightweight frame, so that the pet stroller can be pushed conveniently over grass, sand and virtually all types of rough terrain.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become more apparent in the following detailed description including drawings, all of which show a non-limiting form of the invention, in which.

DETAILED DESCRIPTION OF THE PREFERRED EMBODIMENT

Figure 1:
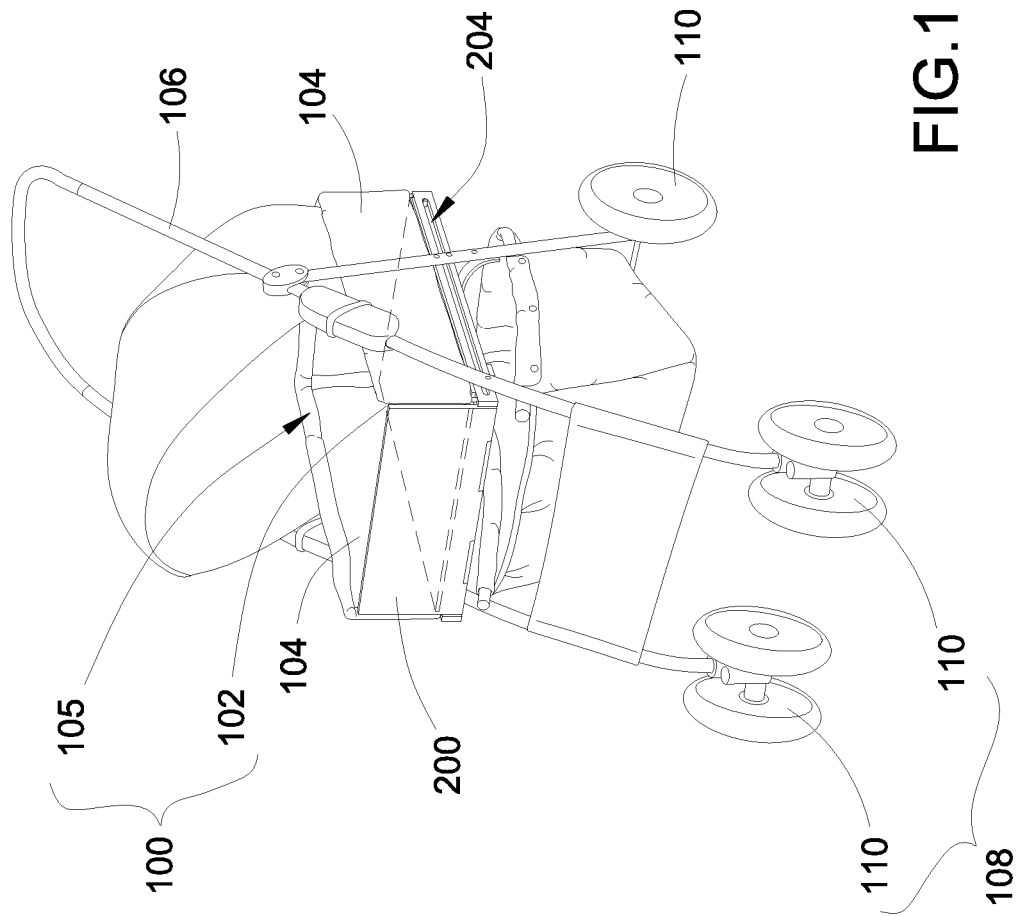
FIG. 1 is a perspective view showing a pet stroller according to the present invention, wherein the ramp member is moved at a storage position.
Figure 2:
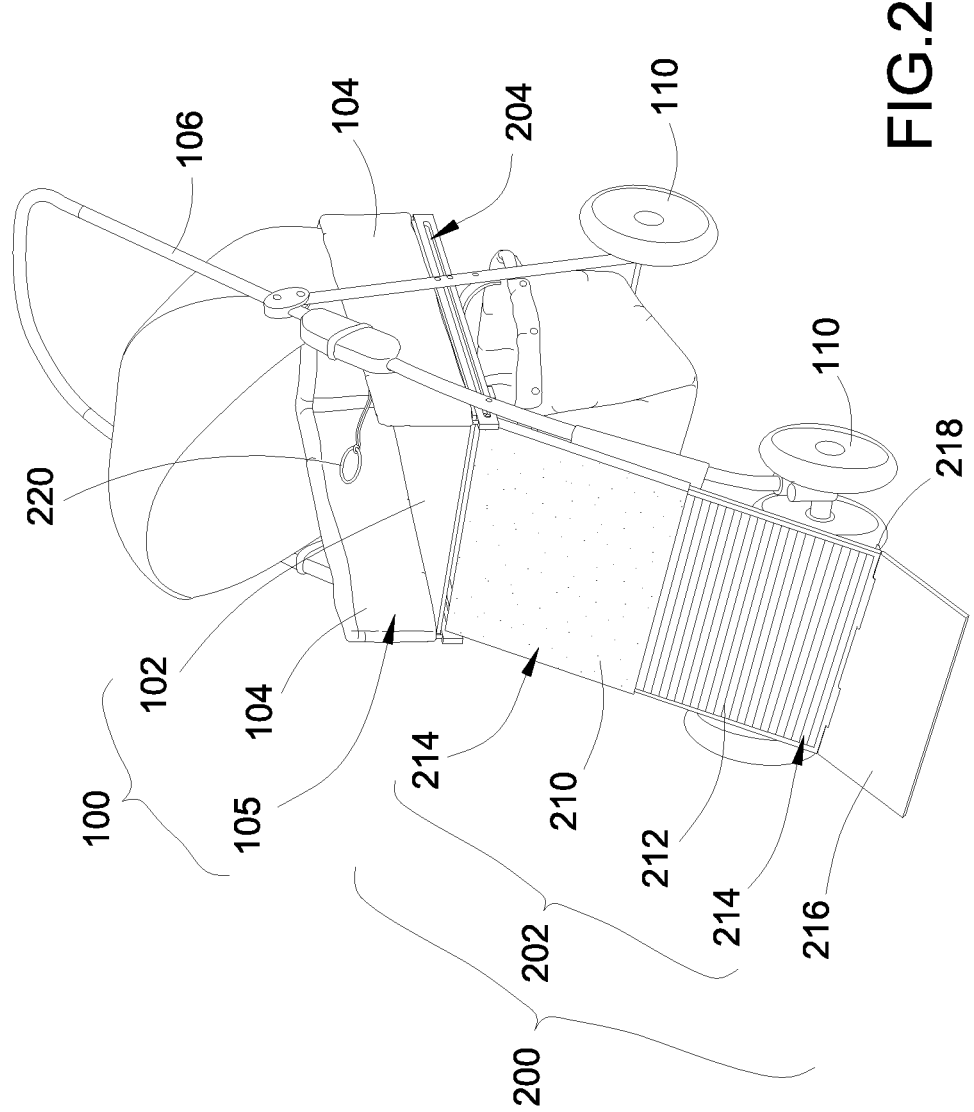
FIG. 2 is a perspective view showing the pet stroller according to the present invention, wherein the ramp member is moved at an extension position for being deployed over the curb or onto the sidewalk.

Referring to FIGS. 1 and 2, an embodiment of a pet stroller according to the present invention is designed for carrying and transporting a pet, such as a dog or cat, especially injured or disabled dogs or cats, while the pet is restrained therein. The pet stroller, which is a collapsible stroller, comprises a supporting frame 100 comprising a supporting platform 102 for the pet lying and two side boundary members 104 upwardly extended from two side of the supporting platform 102 to define a pet accommodating cavity 105 within the supporting platform 102 and the side boundary members 104. The pet stroller further comprises a handle frame 106 upwardly extended from the supporting frame 100 and a wheel frame 108 coupled at a bottom side of the supporting frame 100. The wheel frame 108 comprises a plurality of wheels 110 rotatably coupled at the supporting frame 100 at a position below the supporting platform 100. Therefore, the supporting platform 102 is elevated above the wheels 110, wherein a storage, such as a basin, is provided underneath the supporting platform 102 within the wheels 110. The pet stroller utilizes large, easily maneuverable wheels 110 and the lightweight supporting frame 100, so that the pet stroller can be pushed conveniently over grass, sand and virtually all types of rough terrain.

The pet stroller further comprises a foldable access ramp assembly 200 provided at the supporting frame 100. The foldable access ramp assembly 200 comprises a ramp member 202 slidably coupled at the supporting frame 100 and being moved between a storage position and an extension position. At the storage position, the ramp member 202 is slid within the supporting frame 100 in a hidden manner. At the extension position, the ramp member 202 is slid out from the supporting frame 100 to form a ramp for the pet to access the pet accommodating cavity 105.

Figure 4:
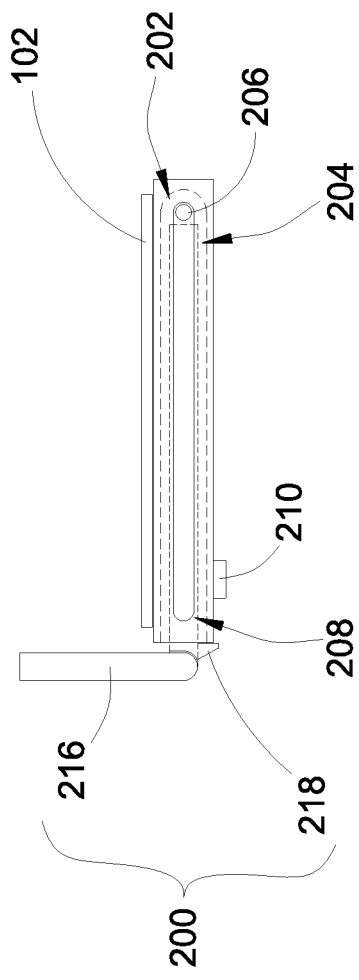
FIG. 4 illustrates the ramp member at the storage position according to the present invention.

In FIGS. 1 and 4, the ramp member 202 is slid underneath the supporting platform 102 at the storage position, so that the ramp member 202 is hidden underneath the supporting platform 102 at the storage position. The unexpected result of receiving the ramp member 202 underneath the supporting platform 102 at the storage position is that the ramp member 202 forms a reinforcing member to reinforce a structure of the supporting platform 102 so as to enhance the supporting strength therefore, especially when a big dog is supported on the supporting platform 102.

Figure 3:
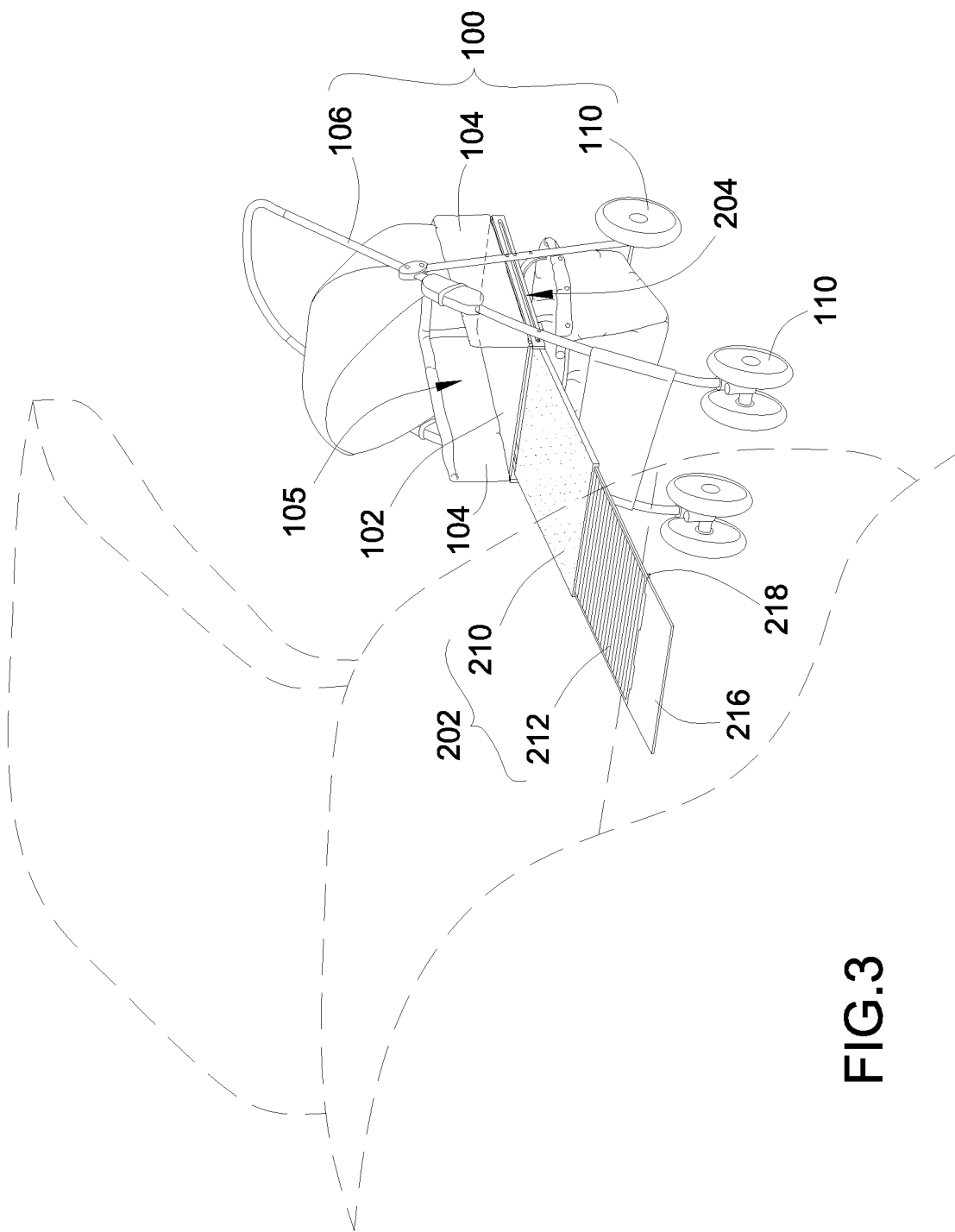
FIG. 3 is a perspective view showing the pet stroller according to the present invention, wherein the ramp member is moved at an extension position for being extended into an interior of the vehicle.
Figure 5:
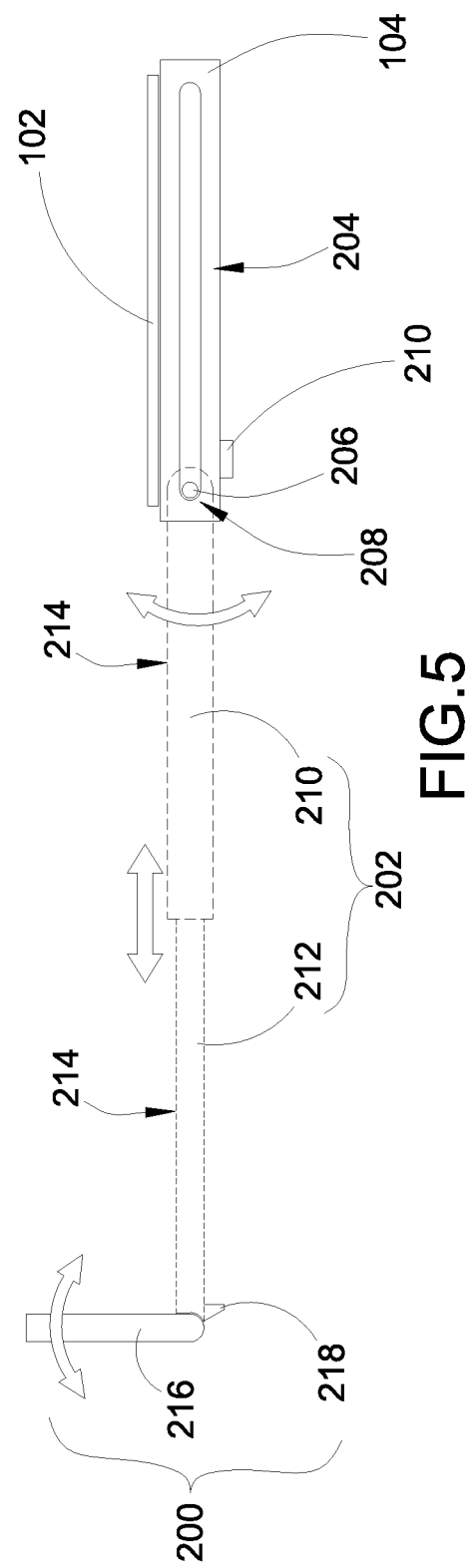
FIG. 5 illustrates the ramp member at the extension position according to the present invention.

In FIGS. 2, 3 and 5, the ramp member 202 is slid out frontwardly to extend from the supporting platform 102 at the extension position. In one embodiment, the ramp member 202 is slid at the extension position for being deployed over a curb or onto a sidewalk to allow the pet easily going in-an-out the supporting platform 102. In another embodiment, the ramp member 202 is slid at the extension position for extending to couple at a vehicle to form a bridge between the supporting platform 102 and the vehicle.

The ramp member 202 and the supporting frame 100 are coupled through a slidable mechanism of the foldable access ramp assembly 200. In one embodiment, the slidable mechanism comprises two sliding tracks 204, i.e. left and right sliding tracks, provided at two sides of the supporting frame 100 respectively and extended underneath the supporting platform 202. Preferably, the sliding tracks 204 are extended parallel to the supporting platform 202 and are provided at bottom portions of the side boundary members 104 respectively. The slidable mechanism further comprises at least two sliding members 206, i.e. left and right sliding members, sidewardly extended from two side edges of the ramp member 202, wherein the sliding members 206 are slidably engaged with the sliding tracks 204 respectively. In one embodiment, the sliding members 206 are extended close to a rear edge of the ramp member 202. Therefore, by slidably engaging the sliding members 206 with the sliding tracks 204, the ramp member 202 can be slid between the storage position and the extension position.

In FIGS. 4 and 5, each of the sliding tracks 204 has a front stopper end 208 to block a further forward sliding movement of the corresponding sliding member 206. The ramp member 202 is frontwardly slid from the storage position to slidably move the sliding members 206 along the sliding tracks 204 until the sliding members 206 are blocked at the front stopper ends 208 thereof to prevent the ramp member 202 being detached from the supporting frame 100. Once the sliding members 206 are blocked at the front stopper ends 208 of the sliding tracks 204, the ramp member 202 is slid at the extension position.

The sliding members 206 are slid toward two rear ends of the sliding tracks 204 to slide the ramp member 202 to its storage position. The foldable access ramp assembly 200 further comprises two platform supporters 210 extended from the sliding tracks 204 respectively to support a front edge portion of the ramp member 202 when the ramp member 202 is moved at the storage position.

It is noted that the ramp member 202 can be pivotally moved when the ramp member 202 is moved at the extension position while the ramp member 202 cannot be pivotally moved at its storage position. The sliding members 204 also form two pivot shafts to enable the pivotal movement of the ramp member 202 when the sliding members 206 are slid at the front stopper ends 208 of the sliding tracks 204. Therefore, the ramp member 202 can be pivotally folded to selectively adjust an angle between the ramp member 202 and the supporting platform 102. The ramp member 202 is downwardly and pivotally folded from the supporting platform 102 for being deployed over the curb or onto the sidewalk. The ramp member 202 is upwardly and pivotally folded from the supporting platform 102 for extending to couple at the vehicle.

According to the embodiment, the ramp member 202 has a telescopic structure, wherein the ramp member 202 comprises a first telescopic member 210 slidably coupled at the supporting frame 100, and a second telescopic member 212 slidably coupled at the first telescopic member 210 in a retractable manner to selectively adjust an extension length of the ramp member 202. The sliding members 206 are extended close to a rear edge of the first telescopic member 210 of the ramp member 202. The first telescopic member 210 has a cavity that the second telescopic member 212 is slidably received therein. The second telescopic member 212 can be fully extended from first telescopic member 210 to maximize the extension length of the ramp member 202. Also, the second telescopic member 212 can be partially extended from first telescopic member 210 to adjust the extension length of the ramp member 202. When the second telescopic member 212 is slid into the first telescopic member 210 in an overlapped manner, the first telescopic member 210 and the second telescopic member 212 form a double layer structure to further enhance the supporting strength of the supporting platform 102.

In the embodiment, the ramp member 202 has a top anti-slipping surface 214 for the pet walking thereon. The top anti-slipping surface 214 can be formed by overlapping and attaching an anti-slipping layer on the ramp member 202. Alternatively, top anti-slipping surface 214 can be formed by forming a plurality of grooves on the ramp member 202 as a top grooved surface. It should be understood that the top anti-slipping surface 214 can be formed by inherently forming a rough, coarse surface on the ramp member 202. In FIG. 2 as an example, the anti-slipping layer is provided on the first telescopic member 210 to form the top anti-slipping surface 214 and the grooves are provided on the second telescopic member 212 to form the top grooved surface as the top anti-slipping surface 214. It is appreciated that the anti-slipping layer can be formed on the second telescopic member 212 and the grooved surface can be formed on the first telescopic member 210.

According to the present invention, the foldable access ramp assembly 200 further comprises a front gate 216 pivotally coupled at a front edge of the ramp member 202. The front gate 216 is limited to be downwardly and pivotally folded to align with the ramp member 202 edge-to-edge in order to form a flat surface extended from the ramp member 202 to the front gate 216. The front gate 216 is also limited to be upwardly and pivotally folded to perpendicularly extend from the ramp member 202. In this embodiment, the front gate 216 is pivotally coupled at the front edge of the second telescopic member 212 of the ramp member 202. The front gate 216 can be downwardly and pivotally folded to extend from the ramp member 202 at the extension position, such that the front gate 216 can be rested on the ground when the ramp member 202 is deployed over the curb or onto the sidewalk, or can be rested on the vehicle when the ramp member 202 is extended to the interior of the vehicle. The front gate 216 can be upwardly and pivotally folded from the ramp member 202 at the storage position to form a front guide of the supporting frame 100. The front gate 216 provides multiple functions of providing an additional extension of the ramp member 202 at the extension position and forming a front boundary for the supporting frame 100 at the storage position. In one embodiment, the front gate 216 is upwardly folded to releasably lock up with the side boundary members 104 to form the front guide of the supporting frame 100. For example, two sides of the front gate 216 are detachably coupled at two front ends of the side boundary members 104 respectively. Therefore, the front gate 216 can be functioned as a front door to open or close the pet accommodating cavity 105 when the ramp member 202 is moved at the storage position.

The foldable access ramp assembly 200 of the present invention further comprises a front hooking member 218 downwardly extended from a bottom side of the ramp member 202. When the ramp member 202 is extended into the interior of the vehicle, such as extended into the back seat of the vehicle or into the trunk area of the vehicle, the front hooking member 218 can be engaged with any part of the vehicle to retain the extension between the ramp member 202 and the vehicle. In one embodiment, the front hooking member 218 is downwardly extended from the front edge of the second telescopic member 212, wherein the second telescopic member 212 is slid into the first telescopic member 210 until the front hook member 218 is blocked at the front edge of the first telescopic member 210.

The foldable access ramp assembly 200 of the present invention further comprises a pet leash cable 220 provided at the supporting frame 100 to releasably couple with a pet collar worn by the pet so as to retain the pet within the pet accommodating cavity 105.

The pet stroller of the present invention can be collapsed into a compact unit for being placed in the vehicle. Once the pet stroller is unfolded, the ramp member 202 can be slid and extended from the supporting platform 102 into the vehicle. Therefore, the ramp member 202 forms a bridge between the vehicle and the pet stroller that the pet can walk from the vehicle to the pet accommodating cavity 105. When the pet rests on the supporting platform 102, the ramp member 202 can be slid back at the storage position to hide underneath the supporting platform 102. Then, the pet owner is able to carry the pet to any park. The ramp member 202 can be slid to the extension position for being deployed over the curb or onto the sidewalk, so that the pet can walk out from the pet accommodating cavity 105. As a result, the pet owners do not have to carry the pet from and to the pet stroller and the pets do not have to jump in and out the pet stroller.

While the invention has been described in connection with what is considered to be the most practical and preferred embodiment, the invention is not to be limited to the disclosure only, but on the contrary it is intended to cover various modifications and equivalent arrangements within the broadest interpretation of the present invention so as to encompass all such modifications and equivalent arrangements.

What is claimed is:

1. A pet stroller for a pet, comprising:
   a supporting frame which comprises a supporting platform for the pet lying thereon, a wheel frame coupled at said supporting frame; and
   a foldable access ramp assembly provided at said supporting frame, wherein said foldable access ramp assembly comprises a ramp member slidably coupled at said supporting frame and being moved in a storage position that said ramp member is supported underneath said supporting platform, and an extension position that said ramp member is slid out frontwardly to extend from said supporting platform for the pet easily accessing in-and-out from said supporting platform, wherein said foldable access ramp assembly further comprises a front gate pivotally coupled at a front edge of said ramp member, wherein said front gate is downwardly and pivotally folded to extend from said ramp member at said extension position and is upwardly and pivotally folded from said ramp member at said storage position to form a front guide of said supporting frame.

2. The pet stroller of claim 1, wherein said foldable access ramp assembly further comprises two sliding tracks provided at two sides of said supporting frame respectively and extended underneath said supporting platform, and at least two sliding members sidewardly extended from two side edges of said ramp member to slidably engage with said sliding tracks respectively, so as to guide said ramp member to slide between said storage position and said extension position.

3. The pet stroller of claim 2, wherein said each of said sliding tracks has a front stopper end, wherein said ramp member is frontwardly slid to slidably move said sliding members along said sliding tracks until said sliding members are blocked at said front stopper ends thereof to prevent said ramp member being detached from said supporting frame.

4. The pet stroller of claim 3, wherein said ramp member is pivotally extended from said supporting frame when said ramp member is moved at said extension position to selectively adjust an angle between said ramp member and said supporting platform.

5. The pet stroller of claim 4, wherein said sliding members are extended close to a rear edge of said ramp member.

6. The pet stroller of claim 5, wherein said foldable access ramp assembly further comprises two platform supporters extended from said sliding tracks respectively to support a front edge portion of said ramp member when said ramp member is moved at said storage position.

7. The pet stroller of claim 6, wherein said ramp member comprises a first telescopic member slidably coupled at said supporting frame, and a second telescopic member slidably coupled at said first telescopic member in a retractable manner to selectively adjust an extension length of said ramp member.

8. The pet stroller of claim 1, wherein said ramp member comprises a first telescopic member slidably coupled at said supporting frame, and a second telescopic member slidably coupled at said first telescopic member in a retractable manner to selectively adjust an extension length of said ramp member.

9. The pet stroller of claim 1, wherein said supporting frame further comprises two side boundary members upwardly extended from two sides of said supporting platform, wherein said front gate is upwardly folded to releasably lock up with said side boundary members to form said front guide of said supporting frame.

10. The pet stroller of claim 9, wherein said ramp member has a top anti-slipping surface.

11. The pet stroller of claim 9, wherein said ramp member has a top grooved surface.

12. The pet stroller of claim 9, wherein said foldable access ramp assembly further comprises a front hooking member downwardly extended from a bottom side of said ramp member.

13. The pet stroller of claim 9, wherein said wheel frame comprises a plurality of wheels rotatably coupled at said supporting frame at a position below said supporting platform.

14. The pet stroller of claim 1, wherein said ramp member has a top anti-slipping surface.

15. The pet stroller of claim 1, wherein said ramp member has a top grooved surface.

16. The pet stroller of claim 1, wherein said foldable access ramp assembly further comprises a front hooking member downwardly extended from a bottom side of said ramp member.

17. The pet stroller of claim 1, wherein said wheel frame comprises a plurality of wheels rotatably coupled at said supporting frame at a position below said supporting platform.

\* \* \* \* \*